3,006,210
REPLACEABLE THREADED SLEEVE FOR GATE TYPE VALVES

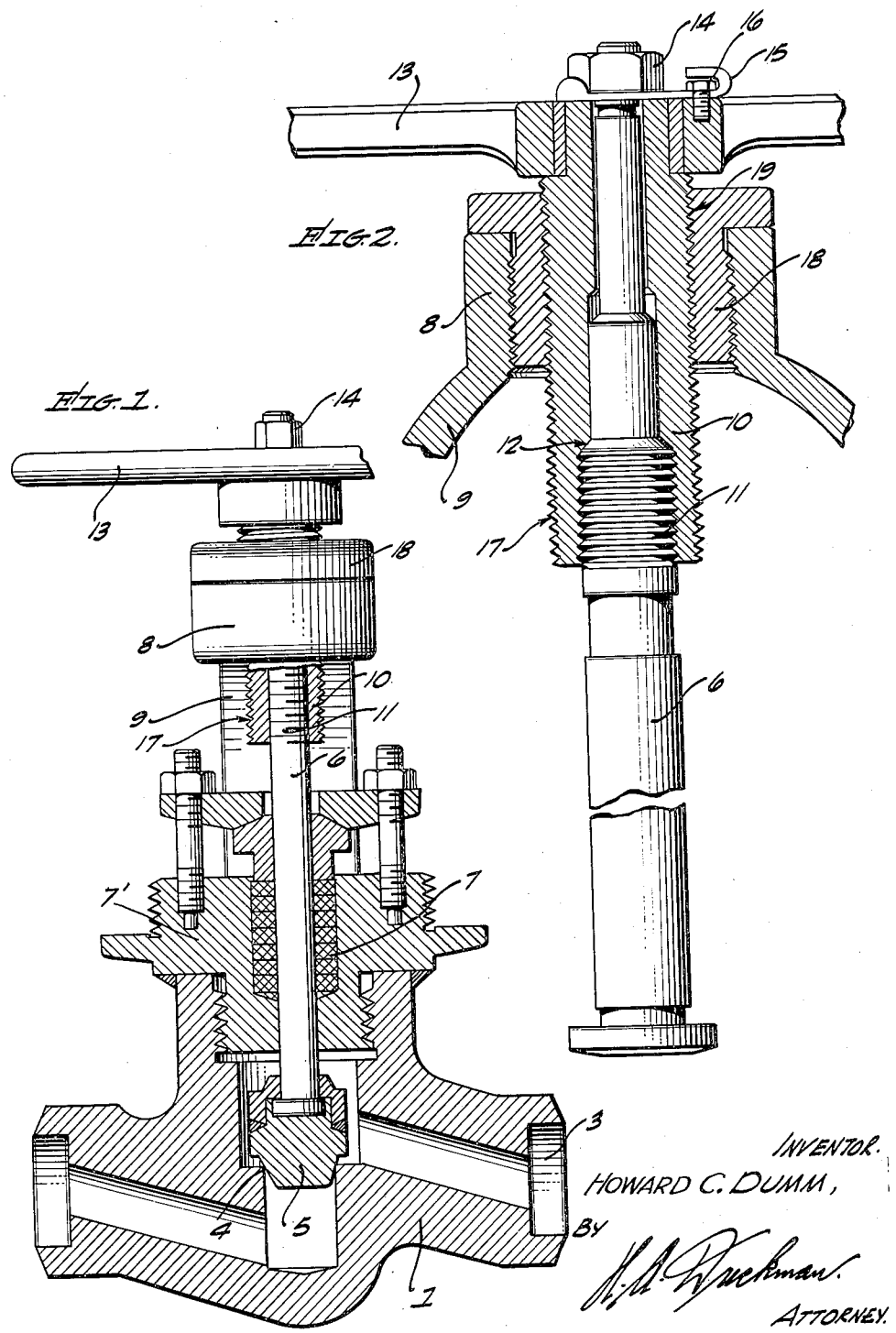

Howard C. Dumm, Long Beach, Calif., assignor to Pacific Valves, Inc., Long Beach, Calif., a corporation of California
Filed Dec. 21, 1959, Ser. No. 860,980
3 Claims. (Cl. 74—424.8)

This invention relates to replaceable threaded sleeves for gate type valves, and the prime object of my invention is to protect the stem of the valve so that the stem need not be replaced during the normal life of the valve. The points of wear, namely, the threads which cause the gate of the valve to raise and lower, are provided on sleeves and these sleeves can be replaced from time to time as necessary and when wear occurs in the threads of these sleeves. As a result the weakest point of wear in the conventional globe or gate valve has been made replaceable, and the useful life of the valve is greatly extended.

My valve is particularly useful in globe or gate valves which are used in nuclear reactors or the like, and where shut-down of the unit due to valve repair is costly, time consuming and difficult. With my valve construction the valve can remain continuously in operation until seat tightness is beyond operational acceptability.

Another object of my invention is to provide a construction wherein all of the wearing parts are easily replaced while the valve is under pressure during operating conditions.

A further object of my invention is to eliminate threads on the stem of the valve, which threads are inclined to wear or gall in actual use of the valve; therefore, the stem life can be expected to equal the life of the valve itself. Therefore, in my valve construction the valve stem need not be replaced at any time during the normal life of the valve.

Still another object of my invention is to provide a valve which has a low initial cost, is compact, and the repair parts are few and simple to replace.

Other objects, advantages and features of invention may appear from the accompanying drawing, and the subjoined detailed description and the appended claims.

In the drawing:

FIGURE 1 is a longitudinal sectional view of a globe valve embodying my new design.

FIGURE 2 is a fragmentary longitudinal sectional view of the valve stem, together with the yoke sleeve and the stem sleeve.

Referring more particularly to the drawing, the numeral 1 indicates the valve body which is formed with an intake port 2 and an outlet port 3. The valve body 1 also includes a seat 4 upon which the globe or gate 5 rests in the closed position of the valve. A stem 6 is attached at its lower end to the globe or gate 5 in the usual and well known manner. This stem extends through a packing gland 7 mounted in the bonnet 7' on the body 1 of the valve. The valve also includes a yoke 8 which is mounted above the body 1 of the valve by means of the arms 9. The stem 6 is moved vertically relative to the body 1 so as to raise or lower the globe or gate 5 in order to operate the valve. Heretofore, threads were provided on the stem 6 and when these threads became worn it was necessary to replace the stem, necessitating a shut-down of the pipe system in which the valve is mounted.

With my new construction the movable threads on the stem 6 are eliminated in the following manner: A stem sleeve 10 is fixedly attached to the upper end of the stem 6. This attachment is preferably accomplished in the following manner: The stem 6 is threaded adjacent its upper end, as shown at 11, and these threads screw into the lower end of the sleeve 10. The stem 6 is provided with a shoulder 12 which seats in the stem sleeve 10 as shown in FIG. 2, thus fixedly mounting the sleeve 10 on the stem 6, but permitting removal and replacement of the sleeve 10 when necessary by unscrewing this sleeve from the stem. The hand wheel 13 is nonrotatably mounted on the upper end of the stem sleeve 10. This is accomplished by means of the nut 14 which threads onto the upper end of the stem 6 and bears against a locking plate 15, which plate is coupled to the hand wheel 13 by means of the stud 16. Thus the stem sleeve 10 and the stem 6 will rotate together when manually moved by means of the hand wheel 13. The stem sleeve 10 is formed with exterior threads 17.

A yoke sleeve 18 screws into the yoke 8 and shoulders on the top of this yoke, thus fixedly mounting the yoke sleeve in the yoke. The yoke sleeve 18 is provided with interior threads 19 which engage the exterior threads 17 of the stem sleeve 10. It will thus be evident that when the hand wheel 13 is rotated the stem sleeve 10 will be threaded vertically through the yoke sleeve 18, thus raising or lowering the globe or gate 5. Since the wearing parts of this type of valve are the threads 17 and 19 these parts can be readily replaced, namely, the stem sleeve 10 and the yoke sleeve 18, without interfering with the stem 6 or the globe 5. The pipe system in which the valve is placed can remain under pressure while the repairs are being accomplished.

Having described my invention, I claim:

1. A valve stem actuating means for a valve which valve includes a bonnet and yoke, and a stem extending through the bonnet, comprising the combination of a stem sleeve surrounding the stem adjacent the upper end of the stem, means removably securing said stem sleeve to said stem, said means nonrotatably mounting the stem sleeve on the stem, a yoke sleeve threaded into said yoke, said yoke sleeve being interiorly threaded to receive exterior threads on the stem sleeve, a hand wheel, means nonrotatably attaching the hand wheel to said stem sleeve.

2. A valve stem actuating means for a valve which valve includes a bonnet and yoke, and a stem extending through the bonnet, comprising the combination of a stem sleeve surrounding the stem adjacent the upper end of the stem, threads on the stem threaded into the lower end of the stem sleeve and nonrotatably attaching the stem to the stem sleeve, a nut threaded onto the upper end of the stem sleeve to nonrotatably hold the stem sleeve in position, a yoke sleeve threaded into said yoke, said yoke sleeve being interiorly threaded to movably receive exterior threads on the stem sleeve and permitting relative movement between the yoke sleeve and the stem sleeve.

3. A valve stem actuating means for a valve which valve includes a bonnet and yoke, and a stem extending through the bonnet, comprising the combination of a stem sleeve surrounding the stem adjacent the upper end of the stem, threads on the stem threaded into the lower end of the stem sleeve and nonrotatably attaching the stem to the stem sleeve, a nut threaded onto the upper end of the stem sleeve to nonrotatably hold the stem sleeve in position, a yoke sleeve threaded into said yoke, said yoke sleeve being interiorly threaded to movably receive exterior threads on the stem sleeve and permitting relative movement between the yoke sleeve and the stem sleeve, a hand wheel removably attached to the stem sleeve and nonrotatable relative to the stem sleeve, a locking plate, one end of the locking plate extending under said nut and the other end of the locking plate including means attaching the locking plate to the hand wheel.

References Cited in the file of this patent

UNITED STATES PATENTS

| | | |
|---|---|---|
| 177,450 | Atkinson | May 16, 1876 |
| 600,249 | Parsells | Mar. 8, 1898 |
| 761,849 | McGowan | June 7, 1904 |
| 1,995,395 | Moho | Mar. 26, 1935 |
| 2,181,059 | Lee | Nov. 21, 1939 |
| 2,555,262 | Weinberg | May 29, 1951 |
| 2,694,547 | MacGregor | Nov. 16, 1954 |
| 2,738,684 | Shafer | Mar. 20, 1956 |

FOREIGN PATENTS

| | | |
|---|---|---|
| 460,450 | Great Britain | Jan. 27, 1937 |